(12) United States Patent
Hsien

(10) Patent No.: US 7,013,763 B2
(45) Date of Patent: Mar. 21, 2006

(54) WRENCH WITH DISPLAY DEVICE

(76) Inventor: Chih-Ching Hsien, No. 367, Pei Yang Rd., Feng Yuan, Taichung (TW)

( * ) Notice: Subject to any disclaimer, the term of this patent is extended or adjusted under 35 U.S.C. 154(b) by 129 days.

(21) Appl. No.: 10/779,675

(22) Filed: Feb. 18, 2004

(65) Prior Publication Data

US 2005/0178248 A1    Aug. 18, 2005

(51) Int. Cl.
*B25B 13/16*    (2006.01)
(52) U.S. Cl. .............................. 81/165; 81/52; 81/170
(58) Field of Classification Search .................. 81/165, 81/170, 52, 126, 129, 133, 429, 467, DIG. 3, 81/DIG. 4, DIG. 5
See application file for complete search history.

(56) References Cited

U.S. PATENT DOCUMENTS

| | | | | |
|---|---|---|---|---|
| 1,562,018 A | * | 11/1925 | Warff | 81/437 |
| 1,846,380 A | * | 2/1932 | Anderson | 81/165 |
| 2,722,150 A | * | 11/1955 | Green | 81/165 |
| 3,948,120 A | * | 4/1976 | Hancock | 81/165 |
| 4,028,970 A | * | 6/1977 | Pelczar | 81/165 |
| 4,326,436 A | * | 4/1982 | McGraw | 81/165 |
| 5,331,868 A | * | 7/1994 | Elmore | 81/165 |
| 5,345,636 A | * | 9/1994 | Lamons | 7/139 |
| 5,385,071 A | * | 1/1995 | Her | 81/177.7 |
| 5,548,903 A | * | 8/1996 | Johnson et al. | 33/810 |
| 5,697,166 A | * | 12/1997 | Hommel | 33/758 |
| 6,508,012 B1 | * | 1/2003 | Wells, Jr. | 33/784 |

* cited by examiner

*Primary Examiner*—Lee D. Wilson
*Assistant Examiner*—Alvin J Grant

(57) ABSTRACT

A display device is connected to a head of a wrench including a fixed jaw and a movable jaw. A variable electric resistor is connected to a side of the head and electrically connected to the display device. The movable jaw has a contact member which is movably in contact with the variable electric resistor. The changes of the value of electric resistance of the variable electric resistor is transformed into digitals to show the distance between the fixed jaw and the movable jaw, that is, the size of an object clamped between the fixed jaw and the movable jaw.

4 Claims, 7 Drawing Sheets

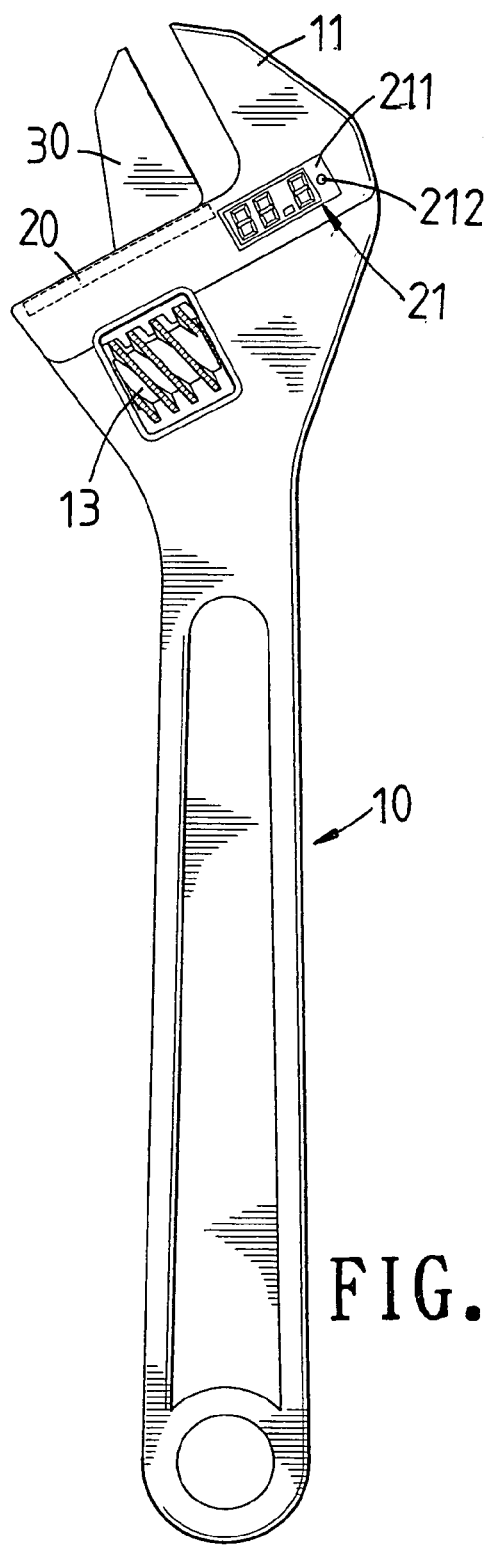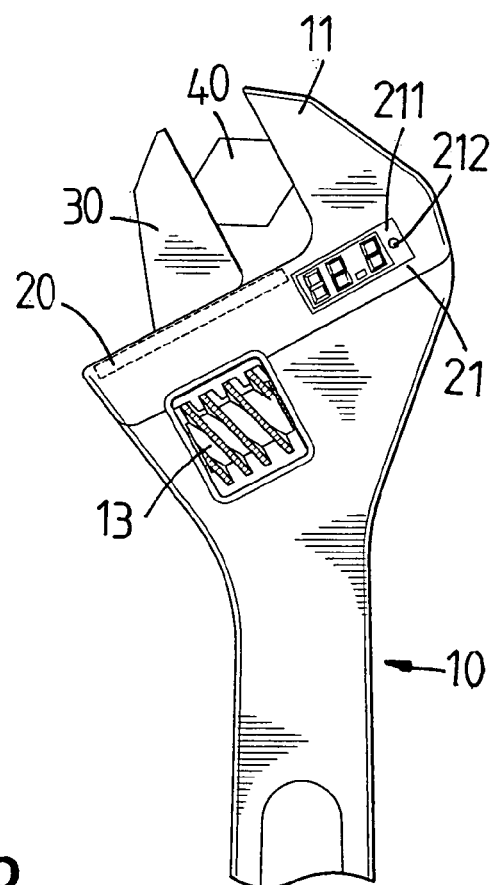
FIG. 3
FIG. 4

WRENCH WITH DISPLAY DEVICE

FIELD OF THE INVENTION

The present invention relates to a wrench having a movable jaw and a fixed jaw. A display device is connected to the wrench and displays the size of the object to be clamped.

BACKGROUND OF THE INVENTION

A conventional adjustable wrench generally includes a handle with a fixed jaw integrally connected to an end thereof and a movable jaw which is movable relative to the fixed jaw so as to clamp an object by the fixed jaw and the movable jaw. Generally, the size of the object clamped by the wrench cannot be told, the user has to use another measurement tool to measure the object before it is rotated by the wrench. A wrench that is developed to have scale markings pressed in a side of the wrench so that the user may check the markings to know the size of the object. Nevertheless, it requires a certain experience to identify the correct scale markings. In other words, there is an error could potentially occur when reading the scale markings if the user views the scale markings at an angle. Besides, the scales are pressed in the surface of the wrench and will be worn out after the wrench is used for a period of time.

The present invention intends to provide a wrench that has a display device which transfers changes of resistance of a variable electric resistor when clamping the object to display the correct size in the screen of the display device.

SUMMARY OF THE INVENTION

The present invention relates to wrench which comprises a fixed jaw integrally connected to an end of the handle and a movable jaw which is movable in a slot defined in the head of the wrench. A through hole is defined through the head and a thumb screw is rotatably engaged with the through hole. The thumb screw is engaged with a rack portion of the movable jaw so that the movable jaw is movable toward the fixed jaw by rotating the thumb screw. A display device is connected to a side of the head of the wrench and includes a screen. A variable electric resistor is connected to the head and electrically connected to the display device. The movable jaw has a contact member which is movably in contact with the variable electric resistor. By the change of the value of the electric resistance, the display device displays the sizes between the fixed jaw and the movable jaw.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 3 is a side view of the first embodiment of the wrench of the present invention;

FIG. 4 is a side view to show that an object is clamped between the fixed jaw and the movable jaw of the first embodiment of the wrench of the present invention;

DETAILED DESCRIPTION OF THE PREFERRED EMBODIMENTS

Figure 1:
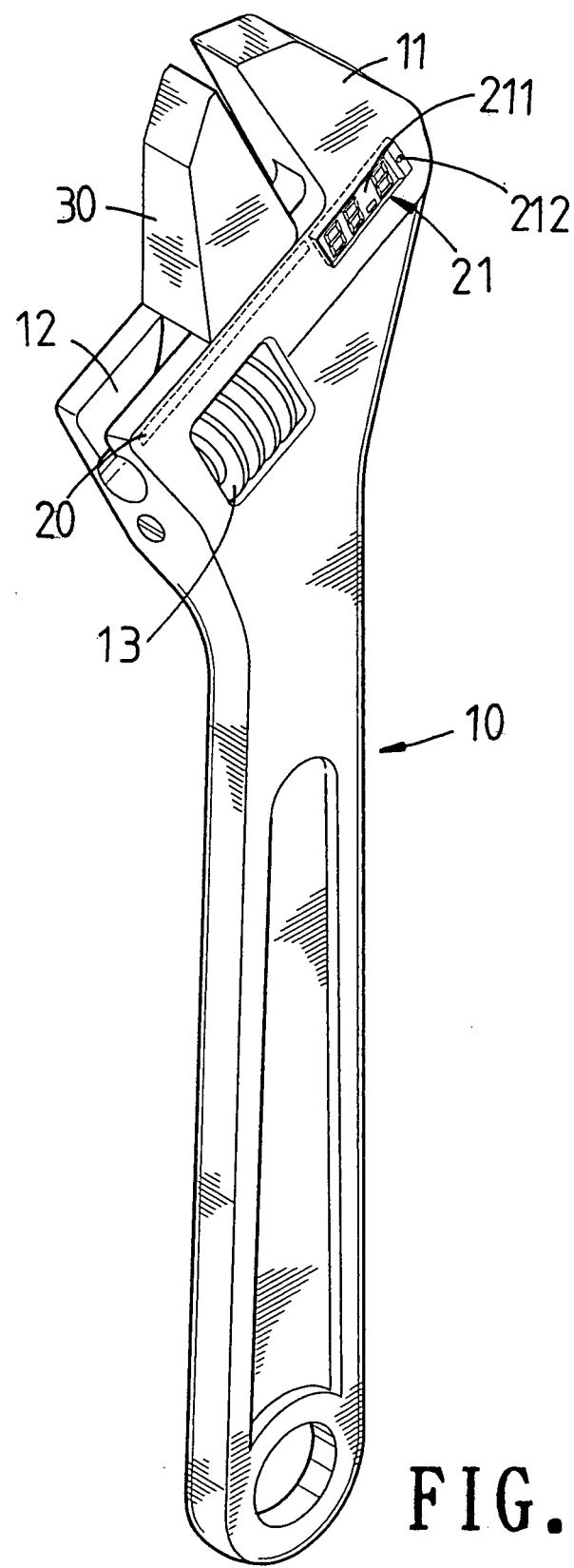
FIG. 1 is a perspective view to show the first embodiment of the wrench of the present invention.
Figure 2:
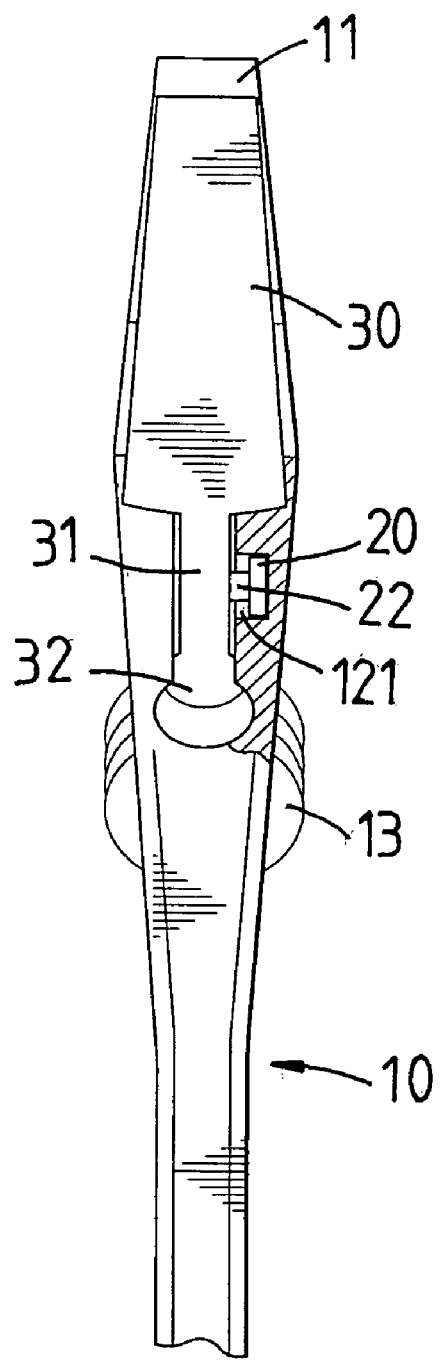
FIG. 2 is an end cross sectional view to show that the contact member on the movable jaw is in contact with the variable electric resistor.

Referring to FIGS. 1 to 3, the wrench 10 of the present invention comprises a handle and a head, a fixed jaw 11 integrally connected to an end of the handle. A through hole is defined through the head and a thumb screw 13 is rotatably engaged with the through hole. A slot 12 is defined in an end of the end of the head.

A movable jaw 30 has an insertion 31 which is movably engaged with the slot 12 and a rack portion 32 is defined in the insertion of the movable jaw 30 and engaged with the thumb screw 13 so that the movable jaw 30 is movable toward the fixed jaw 11 and along the slot 12 by rotating the thumb screw 13.

A display device 21 is connected to a side of the head of the wrench and includes a screen 211 and an adjustment button 212 which is used to adjust the molds displayed in the screen 211. A variable electric resistor 20 is connected to the head and electrically connected to the display device 21. The movable jaw 30 has a contact member 22 which is movably in contact with the variable electric resistor 20.

Referring to FIG. 4, when clamping an object such as a nut 40 by the wrench, the user (not shown) rotates the thumb screw 13 to move the movable jaw 30 toward the fixed jaw 11 till the nut 40 is clamped between the fixed jaw 11 and the movable jaw 30. During movement of the movable jaw 30, the contact member 22 is slid on the variable electric resistor 20 and the value of the resistance is changed. The display device 21 transfers the change of the resistance into digits to show the size of the nut 40. The user can see the digits displayed in the screen 211 and acknowledges the size of the nut 40 immediately.

Figure 5:
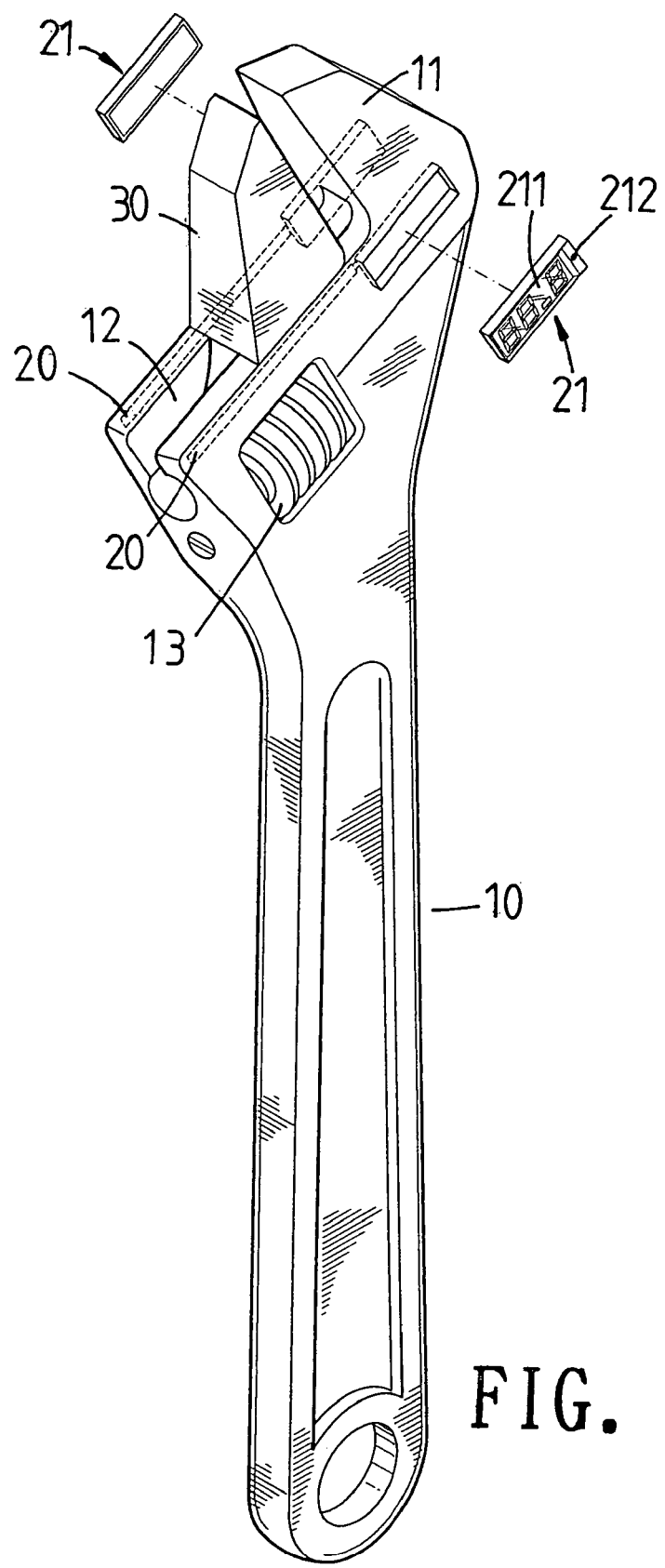
FIG. 5 shows a second embodiment of the present invention wherein two display devices are connected on two sides of the wrench of the present invention.
Figures 6, 7:
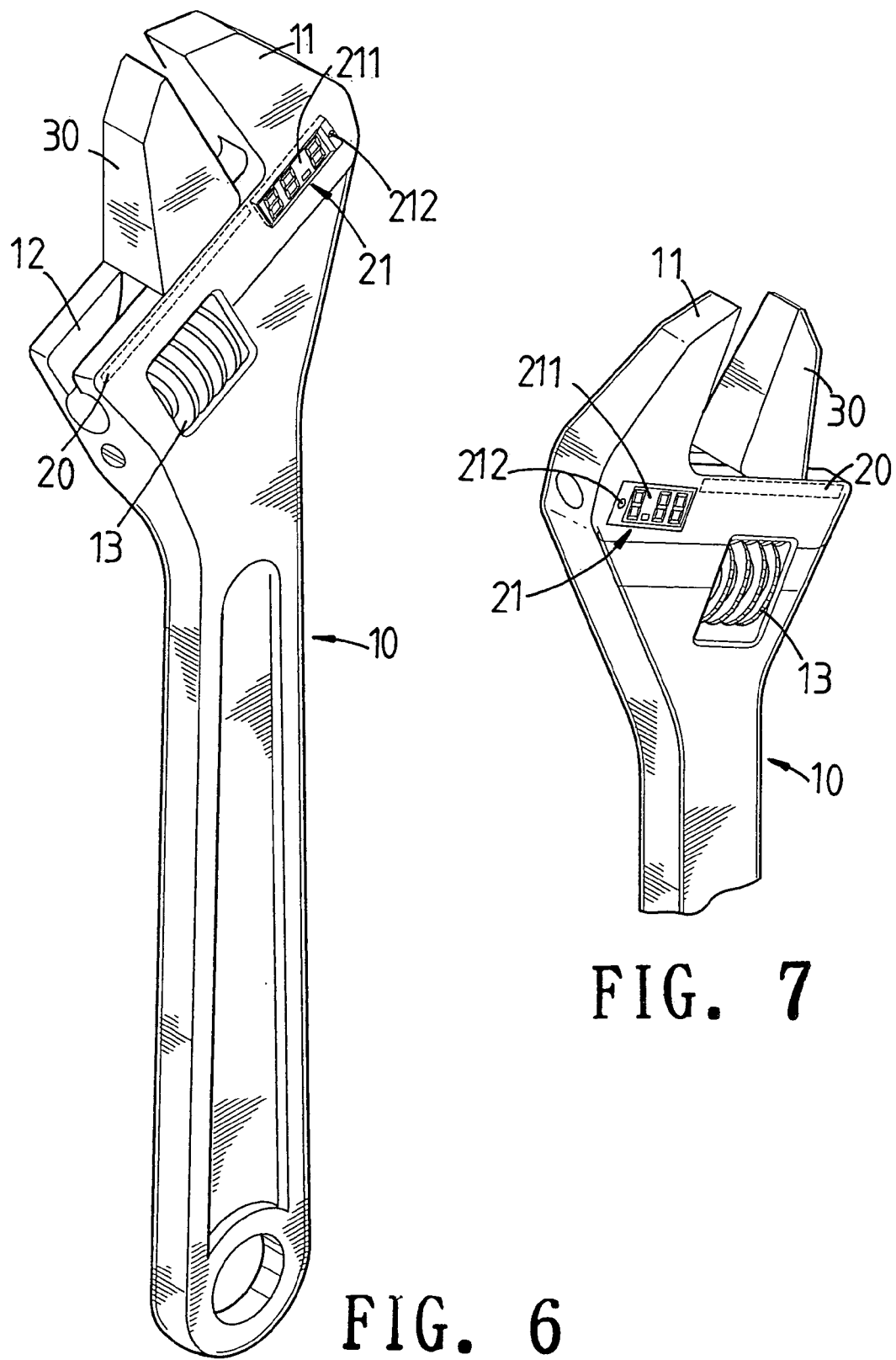
FIG. 6 shows one side of the wrench of the second embodiment of the present invention.
FIG. 7 shows the other side of the wrench of the second embodiment of the present invention.

FIGS. 5 to 7 show that two display devices 21 are respectively connected to two opposite sides of the head of the wrench. The two display devices 21 provide more convenience to the user to check the information of the object that is clamped by the wrench.

Figure 8:
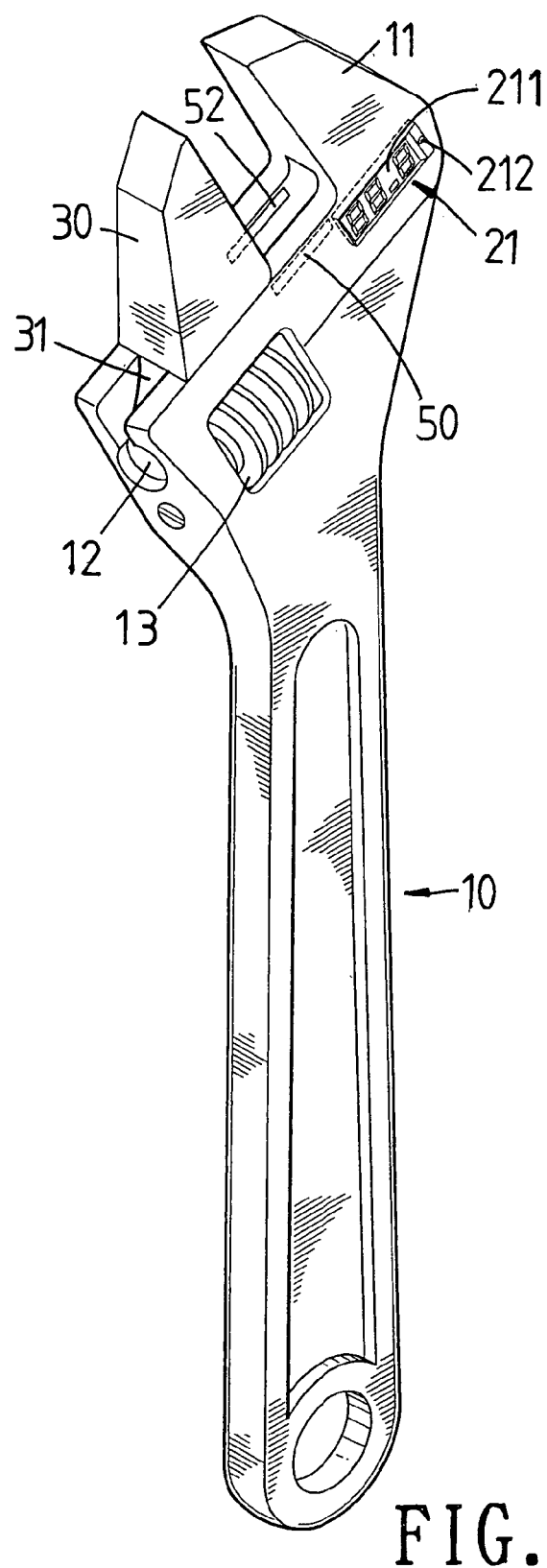
FIG. 8 shows a third embodiment of the wrench of the present invention.

FIG. 8 shows that the display device 21 including a screen 211 and an adjustment button 212 further has a light-activation electric resistor 50 connected to one of two insides of the slot 12 and a light source 52 connected to the other inside of the slot 12. The light-activation electric resistor 50 is electrically connected to the display device 21 and the light source 52 emits a light beam toward the light-activation electric resistor 50. The movable jaw 30 moves along the slot 12 to clamp an object which is not shown and blocks the light beam emitted from the light source 52. The movement of the movable jaw 30 blocks a part of the path of the light beam depending the size of the object. The change of the light beam that is received by the light-activation electric resistor 50 is transferred into digits displayed in the screen 211.

Figure 9:
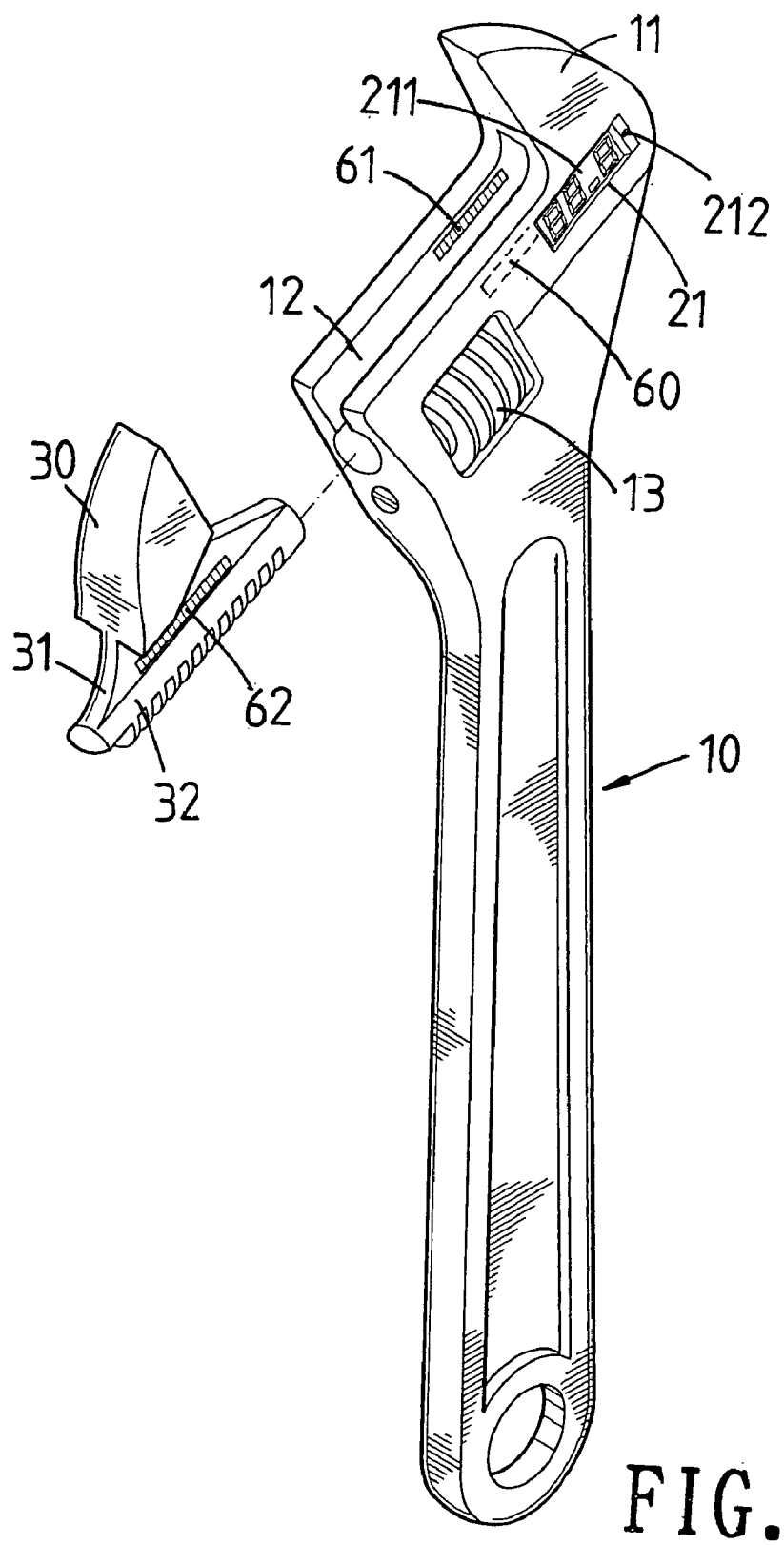
FIG. 9 is an exploded view to show a fourth embodiment of the wrench of the present invention.

FIG. 9 shows yet another embodiment wherein the display device 21 includes a screen 211 and an adjustment button 212. A light source 61 is connected to one of the insides of the slot 12 and a photoelectric member 60 is connected to the other inside of the slot 12 so as to receive a light beam emitted from the light source 61. A fringe 62 is connected to the insertion 31 of the movable jaw 30 such that when clamping an object between the fixed jaw 11 and the movable jaw 30, the light beam emitted from the light source 61 is partially blocked by the fringe 62 so that the light beam to be received by the photoelectric member 60 is changed when different size of objects are clamped. The change of the light beam received by the photoelectric member 60 is transferred into digits displayed in the screen 211.

While we have shown and described the embodiment in accordance with the present invention, it should be clear to those skilled in the art that further embodiments may be made without departing from the scope of the present invention.

What is claimed is:

1. A wrench comprising:
   a handle and a head, a fixed jaw integrally connected to an end of the handle, a through hole defined through the head and a thumb screw rotatably engaged with the through hole, a slot defined in an end of the end of the head;
   a movable jaw having an insertion which is movably engaged with the slot, a rack portion defined in the insertion of the movable jaw and engaged with the thumb screw so that the movable jaw is movable toward the fixed jaw by rotating the thumb screw, and
   a display device connected to a side of the head of the wrench and including a screen, a light-activation electric resistor connected to one of two insides of the slot and electrically connected to the display device, a light source connected to the other inside of the slot and emitting a light beam toward the light-activation electric resistor, the movable jaw moving along the slot and blocking the light beam emitted from the light source.

2. The wrench as claimed in claim 1, wherein the display device includes an adjustment button.

3. A wrench comprising:
   a handle and a head, a fixed jaw integrally connected to an end of the handle, a through hole defined through the head and a thumb screw rotatably engaged with the through hole, a slot defined in an end of the end of the head;
   a movable jaw having an insertion which is movably engaged with the slot, a rack portion defined in the insertion of the movable jaw and engaged with the thumb screw so that the movable jaw is movable toward the fixed jaw by rotating the thumb screw, and
   a display device connected to a side of the head of the wrench and including a screen, light source connected to one of the insides of the slot and a photoelectric member connected to the other inside of the slot so as to receive a light beam emitted from the light source, a fringe connected to the insertion of the movable jaw.

4. The wrench as claimed in claim 3, wherein the display device includes an adjustment button.

\* \* \* \* \*